(12) United States Patent
Hodumi

(10) Patent No.: US 7,066,456 B2
(45) Date of Patent: Jun. 27, 2006

(54) HYDRAULIC SHOCK ABSORBER MOUNTING STRUCTURE

(75) Inventor: Yutaka Hodumi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/639,797

(22) Filed: Aug. 12, 2003

(65) Prior Publication Data
US 2004/0041320 A1     Mar. 4, 2004

(30) Foreign Application Priority Data
Aug. 30, 2002   (JP)   ............... 2002-253576

(51) Int. Cl.
  *B60G 5/00*     (2006.01)
  *B62D 65/00*   (2006.01)
(52) U.S. Cl. ............ 267/220; 280/124.15; 267/140; 267/153
(58) Field of Classification Search .......... 188/321.11, 188/322.12, 300; 267/220, 140, 153; 280/124.15
See application file for complete search history.

(56) References Cited

U.S. PATENT DOCUMENTS 3,449,799 A * 6/1969 Bien ........................ 411/548
4,958,849 A   9/1990 Pinch et al.
5,096,168 A * 3/1992 Takehara et al. ............ 267/220
5,326,082 A * 7/1994 Ecktman et al. ......... 267/64.27
5,628,388 A   5/1997 Angermann
5,641,152 A * 6/1997 Angles et al. ............. 267/220
5,788,262 A * 8/1998 Dazy et al. ........... 280/124.155
6,648,110 B1 * 11/2003 Nakamura ............. 188/322.12

FOREIGN PATENT DOCUMENTS

DE    100 18 058 A1   10/2001
JP    59-54233        4/1984

* cited by examiner

Primary Examiner—Christopher P. Schwartz
(74) Attorney, Agent, or Firm—Carrier, Blackman & Associates, P.C.; William D. Blackman; Joseph P. Carrier

(57) ABSTRACT

An upper portion of a rod protruding from an upper end of a hydraulic cylinder of a hydraulic shock absorber, which suspends a wheel from a vehicle body, is inserted from below into a mounting hole in an upper wall of a wheel house, and with a lower portion and an upper portion of the mounting hole being held by a lower damper mount bushing and an upper damper mount portion, respectively, a nut is then screwed on the upper portion of the rod to thereby fasten the rod to the upper wall of the wheel house. A temporarily fastening locking portion formed integrally with the lower damper mount bushing and fixed to the rod is brought into engagement with the mounting hole in the wheel house to prevent the hydraulic shock absorber from falling away from the wheel house during installation.

20 Claims, 5 Drawing Sheets

HYDRAULIC SHOCK ABSORBER MOUNTING STRUCTURE

BACKGROUND OF THE INVENTION

1. Field of the Invention

The present invention relates to a hydraulic shock absorber mounting structure for mounting an upper portion of a rod which protrudes telescopically from an upper end of a hydraulic cylinder of a hydraulic shock absorber for suspending a wheel from a vehicle body into a mounting hole in an upper wall of a wheel house via a resilient body.

2. Description of the Related Art

A related-art hydraulic shock absorber mounting structure is shown in FIG. 6. A bottomed cylindrical outer tube 03 is fixed to a rod 02 protruding telescopically from a cylinder 01 of a hydraulic shock absorber SA. A washer 04, a collar 05 and a washer 06 are caused to fit on a portion of the rod 02 which telescopically protrudes from an upper surface of the outer tube 03, and the rod 02 is then fastened with a nut 07. The collar 05 loosely passes through a mounting hole 09 in a wheel house 08. A lower damper mount bushing 010 and an upper damper mount bushing 011 are supported on an outer circumference of the collar 05 held between the two washers 04, 06. A lower damper mount bushing support seat 012 is fixed to a lower side of the mounting hole 9 and an upper damper mount bushing support seat 013 is fixed to an upper side of the mounting hole 9. The lower damper mount bushing 010 and the upper damper mount bushing 011 are supported by the lower damper mount bushing support seat 012 and the upper damper mount bushing support seat 013, respectively.

This related-art hydraulic shock absorber SA is designed to be assembled in place by inserting from below the rod 02 into the mounting hole 09 in the wheel house 08 with the washer 04, the collar 05 and the lower damper mount bushing 010 being supported on a distal end of the rod 02, causing the upper damper mount bushing 011 and the washer 06 to fit on the rod 02 which protrudes upwardly from the mounting hole 09, and thereafter fastening the rod 02 with a nut 07. When the hand is removed from the hydraulic shock absorber SA after the rod 02 has been inserted from below into the mounting hole 09 in the wheel house 08, however, since the hydraulic shock absorber SA falls from its weight to come off the mounting hole 09, the hydraulic shock absorber SA needs to be retained in the interior of the wheel house 08 using a special fixture until the upper damper mount bushing 011 and the washer 06 are caused to fit on the rod 02 and the rod 02 is then fastened with the nut 07. This causes a problem in that workability is deteriorated remarkably.

SUMMARY OF THE INVENTION

The invention was made in view of the mounting difficulties of the related art, and an object thereof is to provide a hydraulic shock absorber mounting structure which can improve the workability in assembling the upper end of the hydraulic shock absorber into the mounting hole in the wheel house.

With a view to attaining the object, according to a first aspect of the invention, there is proposed a hydraulic shock absorber mounting structure comprising: a rod protruding telescopically from an upper end of a hydraulic cylinder of a hydraulic shock absorber, the rod having an upper portion which is adapted to be inserted from below into a mounting hole in an upper wall of a wheel house; a resilient body fixed on the rod; a nut which screws on the upper portion of the rod with the resilient body being interposed between the rod and the mounting hole to thereby fasten the rod to the upper wall of the wheel house: and a temporarily fastening locking portion integrally formed on the resilient body which temporarily fastens the hydraulic shock absorber to the upper wall of the wheel house when the temporarily fastening locking portion is brought into engagement with the mounting hole in the wheel house.

According to the construction, since the temporarily fastening locking portion is integrally formed on the resilient body fixed to the rod protruding telescopically from the upper end of the hydraulic cylinder and the locking portion is brought into engagement with the mounting hole in the upper wall of the wheel house, even when the hand is removed from the hydraulic cylinder with the rod being inserted into the mounting hole, there is no risk that the rod comes off the mounting hole to fall. Consequently, this obviates the necessity of retaining the hydraulic shock absorber with a special fixture in the interior of the wheel house while the nut is screwed onto the distal end of the rod to thereby fasten it to the upper wall of the wheel house; the workability being thereby improved remarkably.

According to a second aspect of the invention, there is proposed a hydraulic shock absorber mounting structure as set forth in the first aspect of the invention, wherein the resilient body comprises a tubular portion which fits on an outer circumference of the rod so as to be inserted into the mounting hole, and wherein the locking portion is integrally formed on an upper end of the tubular portion.

According to the construction, since the resilient body comprises the tubular portion which fits on the outer circumference of the rod so as to be inserted into the mounting hole and the locking portion is integrally formed on the upper end of the tubular portion, a pre-compression can be imparted to the resilient body by compressing the tubular portion at the time of fastening with the nut, this being able to contribute to the improvement in response of the suspension.

Note that a lower damper mount bushing 18 described in an embodiment corresponds to the resilient body of the invention.

DETAILED DESCRIPTION OF THE INVENTION

A mode for carrying out the invention will be described below based on an embodiment of the invention which is illustrated in the accompanying drawings.

Figure 1:
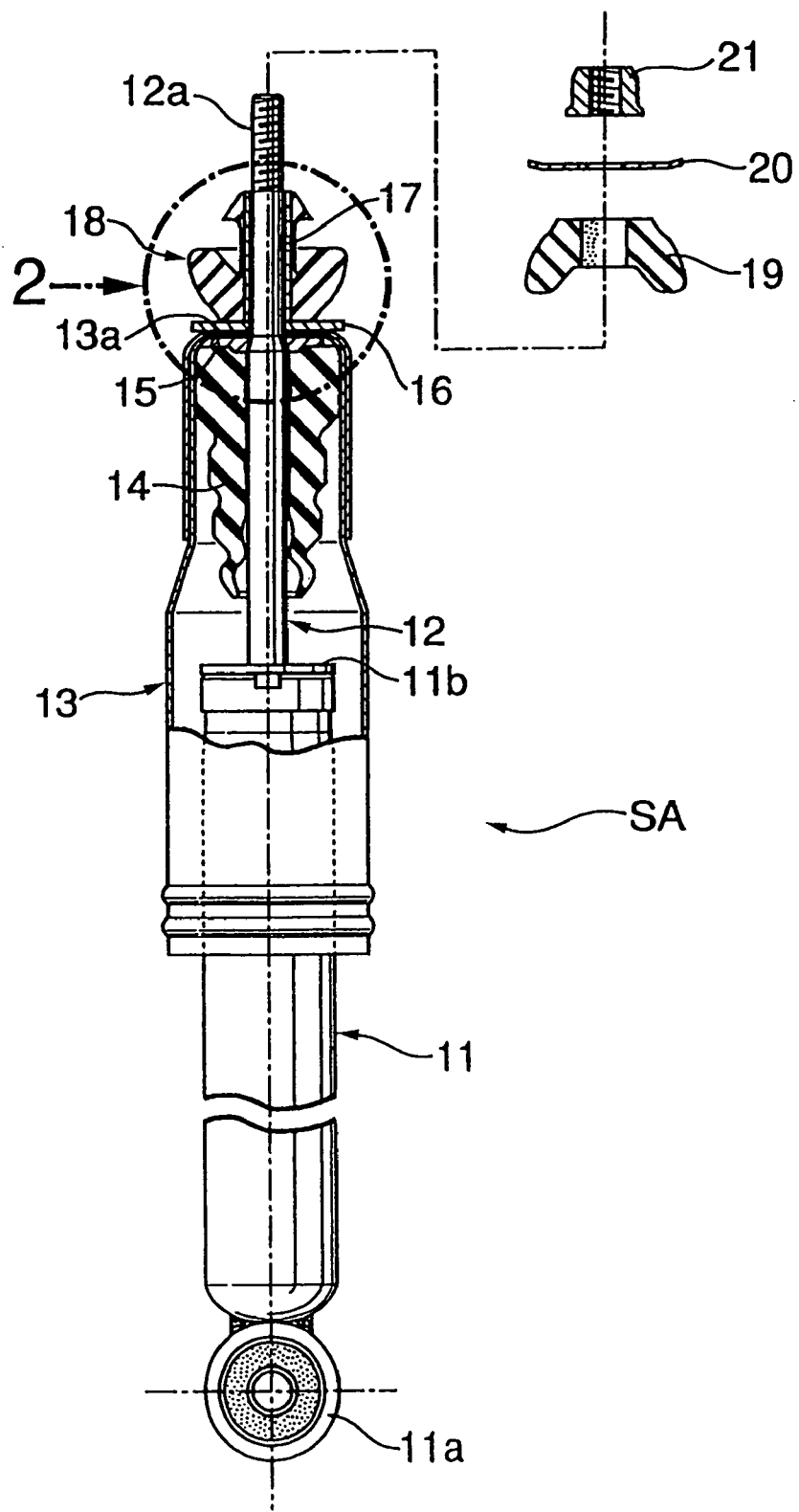
FIG. 1 is a partial exploded view of a hydraulic shock absorber according to an embodiment of the present.
Figure 2:
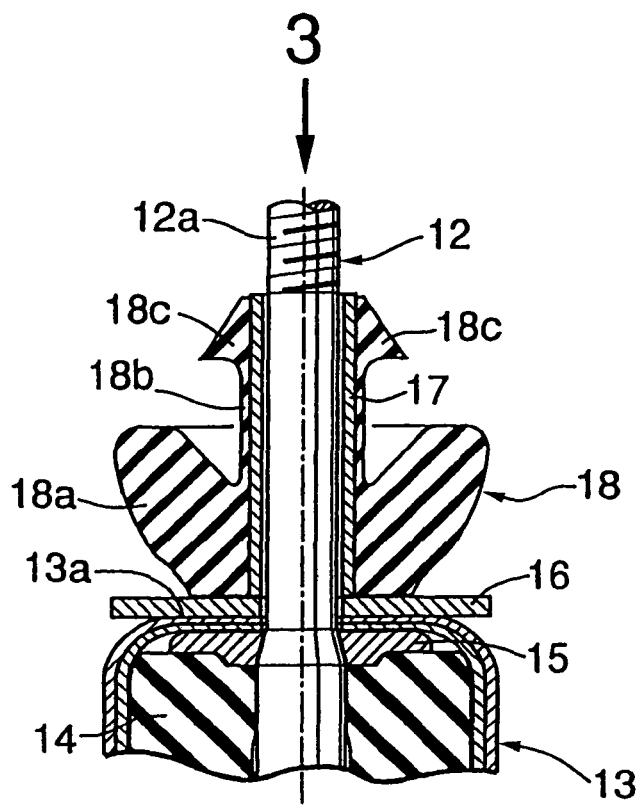
FIG. 2 is an exploded view of a part indicated by an arrow 2 in FIG. 1.
Figure 3:
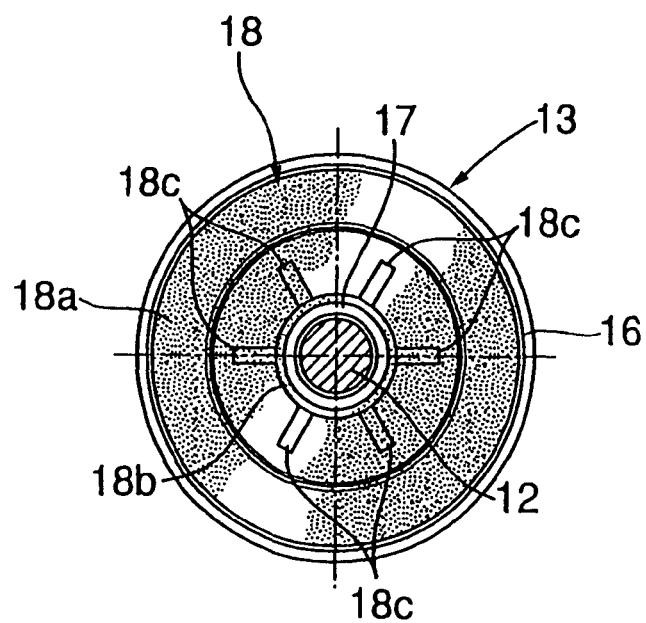
FIG. 3 is a top plan view taken along the arrow 3 in FIG. 2.
Figure 4A:
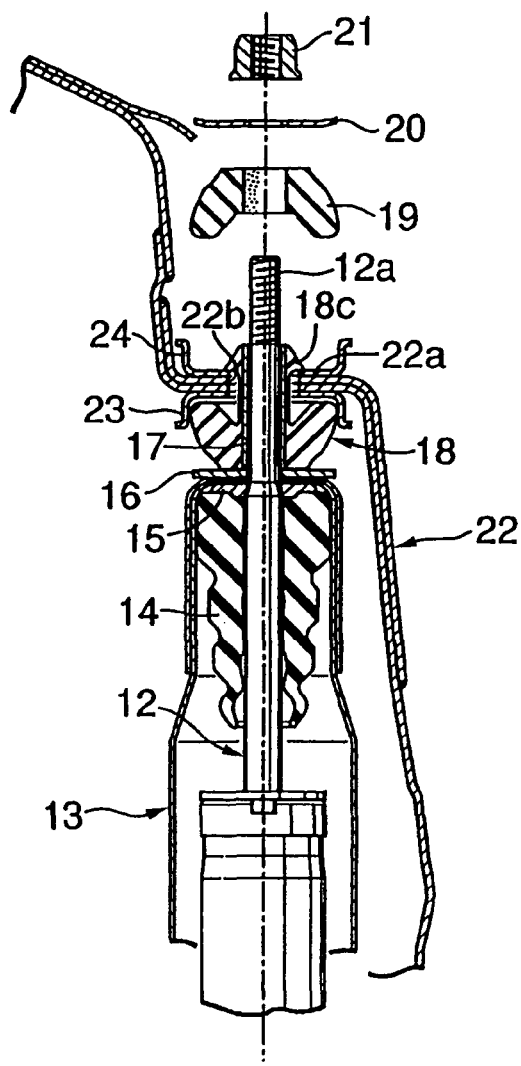
FIGS. 4A and 4B are drawings explaining operations when assembling the hydraulic shock absorber.
Figure 4B:
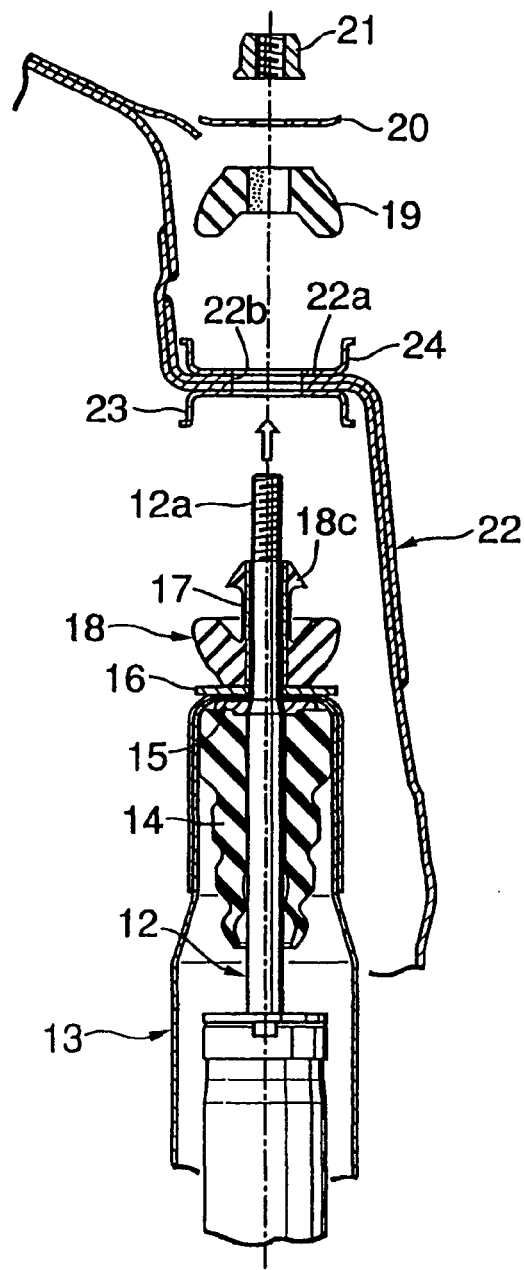
Figure 5:
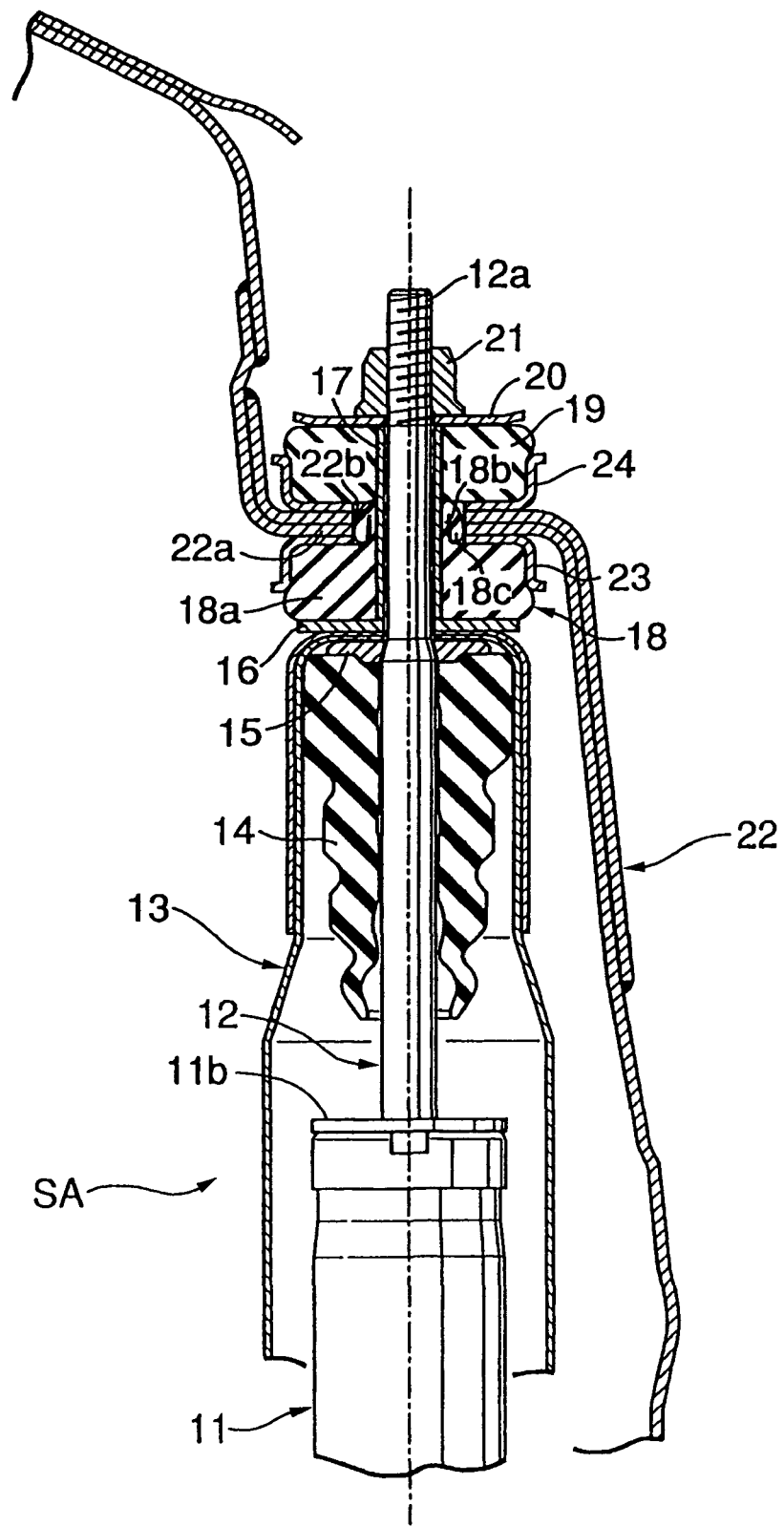
FIG. 5 is a drawing showing an assembled condition of the hydraulic shock absorber.
Figure 6:
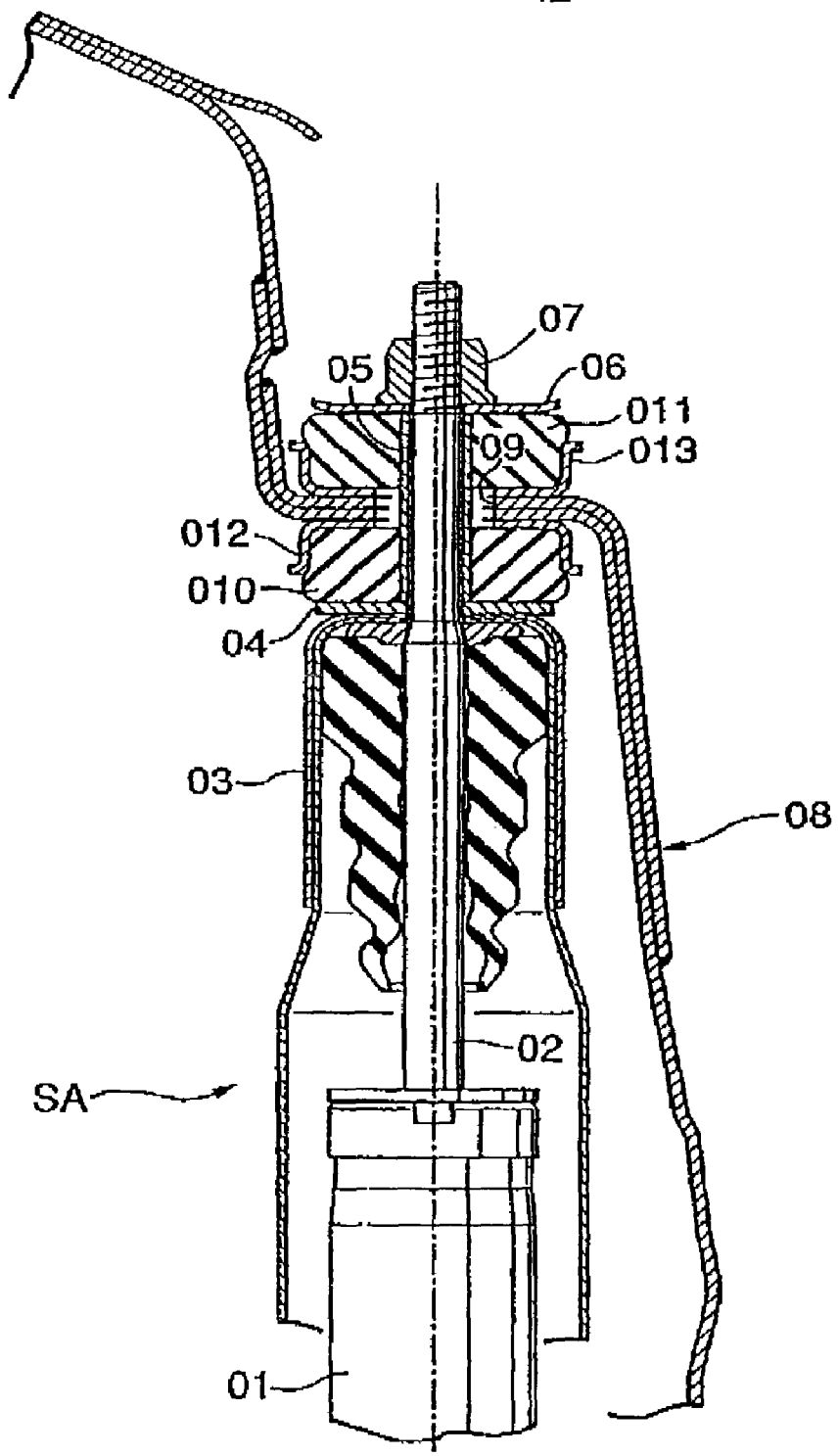
FIG. 6 is a drawing showing an assembled condition of a related-art hydraulic shock absorber.

FIGS. 1 to 5 show an embodiment of the invention. FIG. 1 is a partial exploded view of a hydraulic shock absorber. FIG. 2 is an enlarged view of a portion of the hydraulic shock absorber which is indicated by an arrow 2 in FIG. 1. FIG. 3 is a view as viewed in a direction indicated by an arrow 3 in FIG. 2. FIGS. 4A and 4B are drawings showing operations carried out when mounting the hydraulic shock absorber. FIG. 5 is a drawing showing a state in which the hydraulic shock absorber has completely been mounted.

As shown in FIG. 1, a hydraulic shock absorber SA which suspends a wheel of an automotive vehicle from a vehicle body includes a hydraulic cylinder 11 having hydraulic fluid sealed in the interior thereof and a rod 12 which protrudes telescopically from an upper end of the hydraulic cylinder 11. A mounting portion 11a at a lower end of the hydraulic cylinder is connected to a knuckle (or a suspension arm), not shown, which supports the wheel, via a rubber bushing. A bottom wall 13a of a bottomed cylindrical outer tube 13 is fixed to an intermediate portion of the rod 12 protruding from the hydraulic cylinder 11, and the outer tube 13 covers a lower part of the rod 12 and an upper part of the hydraulic cylinder 11. A bump stop rubber 14 is fixed to an outer circumference of the rod 12 covered by the outer tube 13. The bump stop rubber 14 abuts with a bump stop plate 15 provided on a lower side of the bottom wall 13a of the outer tube 13 at an upper end thereof. The bump stop rubber 14 also faces at a lower end thereof a load bearing surface 11b at the upper end of the hydraulic cylinder 11 with a predetermined distance being provided therebetween. When the wheel receives a large load from the road surface, whereby the rod is pushed into the interior of the hydraulic cylinder 11 a predetermined amount, the lower end of the bump stop rubber 14 is brought into abutment with the load bearing surface 11b of the hydraulic cylinder 11 to thereby restrict the stroke of the rod 12.

A washer 16 and a collar 17 fit on the rod 12 which protrudes upwardly from the outer tube 13, and a lower damper mount bushing 18 fits on the collar 17. The collar 17 is fixed to the rod 12 by crimping, and the lower damper mount bushing 18 is supported on the collar 17 by virtue of friction force resulting from its own resiliency. Furthermore, an upper damper mount bushing 19 and a washer 20 are fit on the upper end of the rod 12, and the rod 12 is then fastened to the vehicle body with a nut 21 which thread fits on external ridges or threads 12a formed on the rod 12.

As is clear from FIGS. 2 and 3, the lower damper mount bushing 18 has a main body portion 18a, a thin tubular portion 18b and locking portions 18c. The main body portion 18a has a cup-like shape which is made to open upwardly. The thin tubular portion 18b extends upwardly from the main body portion 18a to fit on an outer circumference of the collar 17. The locking portions 18c are formed integrally with an upper end of the tubular portion 18b. A plurality of locking portions 18c (six in this embodiment) extend radially from the tubular portion 18b and are provided circumferentially at regular intervals, each being formed into a hook-like shape which is pointed upwardly. Note that the upper damper mount bushing 19 is a member which is formed into a vertically symmetrical shape with the main body portion 18a of the lower damper mount bushing 18, but the upper damper mount bushing 19 does not have portions corresponding to the tubular portion 18b and the locking portions 18c.

As shown in FIGS. 4A and 4B, a mounting hole 22b is formed in an upper wall 22a of a wheel house 22 to which the upper end portion of the hydraulic shock absorber SA is mounted. A lower damper mount bushing support seat 23 is welded to a lower side of the mounting hole 22b, whereas an upper damper mount bushing support seat 24 is welded to an upper side of the mounting hole 22b. An inside diameter of the mounting hole 22b is set larger than an outside diameter of the tubular portion 18b of the lower damper mount bushing 18.

Next, the function of the embodiment according to the invention which is constructed as has been described heretofore will be described.

As shown in FIG. 4B, the upper end of the rod 12 of the hydraulic shock absorber SA is inserted from below into the mounting hole 22b in the upper wall 22a of the wheel house 22 with the washer 16, the collar 17 and the lower damper mount bushing 18 being assembled to the rod 12. As this occurs, the locking portions 18c of the lower damper mount bushing 18 deform resiliently to pass through the mounting hole 22b and protrude above the mounting hole 22b, as shown in FIG. 4A. As a result, the rod 12 is prevented from coming off the mounting hole 22b to fall by bringing the locking portions 18c into engagement with the upper side of the mounting hole 22b even if the hydraulic shock absorber SA is not retained with the special fixture in the interior of the wheel house 22. Therefore, the workability in assembling the hydraulic shock absorber SA to the vehicle body can be improved remarkably.

In this state, the upper damper mount bushing 19 and the washer 20 are caused to fit on the upper end of the rod 12 from above, outside the wheel house 22, and the nut 21 is thread fit on the external ridges or threads 12a formed on the rod 12 and is then tightened. Thus, the lower damper mount bushing 18 supported by the lower damper mount bushing support seat 23 at the upper side thereof and the upper damper mount bushing 19 supported on the upper damper mount bushing support seat 24 at the lower side thereof are compressed vertically, resulting in an assembled condition as shown in FIG. 5. As this occurs, the compression amount of the lower damper mount bushing 18 and the upper damper mount bushing 19 is restricted to a predetermined magnitude through the abutment of the upper washer 20 with the collar 17.

In the assembled condition shown in FIG. 5, the tubular portion 18b and the locking portions 18c of the lower damper mount bushing 18 are collapsed downwardly by the upper damper mount bushing 19 and are then pushed back into a gap formed around an inner circumference of the mounting hole 22b. Thus, a pre-compression is imparted to the lower damper mount bushing 18 and the upper damper mount bushing 19 when the tubular portion 18b and the locking portions 18c are so compressed, this being able to contribute to the improvement in response of the suspension.

While the embodiment of the invention has been described in detail heretofore, various design modifications can be made to the invention without departing from the spirit and scope of the invention.

For example, the shape and number of locking portions 18c of the lower damper mount bushing 18 are not limited to those described in the embodiment and can be modified appropriately. That is, the locking portions 18c can be configured in any shape or number as long as they are operable to at least temporarily hold the absorber during a mounting procedure.

Thus, according to the first aspect of the invention, since the temporarily fastening locking portions are integrally formed on the resilient body fixed to the rod protruding telescopically from the upper end of the hydraulic cylinder and the locking portions are brought into engagement with the mounting hole in the upper wall of the wheel house, even when the hand is removed from the hydraulic cylinder with the rod being inserted into the mounting hole, there is no risk that the rod comes off the mounting hole to fall. Consequently, this obviates the necessity of retaining the hydraulic shock absorber with a special fixture in the interior of the wheel house while the nut is screwed onto the distal end of the rod to thereby fasten it to the upper wall of the wheel house; the workability being thereby improved remarkably.

In addition, according to the second aspect of the invention, since the resilient body has the tubular portion which fits on the outer circumference of the rod so as to be inserted into the mounting hole and the locking portions are integrally formed on the upper end of the tubular portion, a pre-compression can be imparted to the resilient body by compressing the tubular portion at the time of fastening with the nut, this being able to contribute to the improvement in response of the suspension.

What is claimed is:

1. A hydraulic shock absorber mounting structure, comprising:
    a rod protruding telescopically from an upper end of a hydraulic cylinder of a hydraulic shock absorber, the rod having an upper portion which is adapted to be inserted from below into a mounting hole in an upper wall of a wheel house;
    a resilient body fixed on the rod, the resilient body comprising a main body portion, a temporarily fastening locking portion, and a tubular portion connecting the main body portion to the temporarily fastening locking portion, the main body portion being substantially cup shaped and oriented to open upward, the tubular portion extending upward from an interior surface of the main body portion;
    a nut which screws on the upper portion of the rod with the resilient body being interposed between the rod and the mounting hole to thereby fasten the rod to the upper wall of the wheel house; and
    wherein the temporarily fastening locking portion integrally formed on the resilient body temporarily fastens the hydraulic shock absorber to the upper wall of the wheel house when the temporarily fastening locking portion is brought into engagement with the mounting hole in the wheel house.

2. A hydraulic shock absorber mounting structure as set forth in claim 1, wherein the tubular portion fits on an outer circumference of the rod so as to be inserted into the mounting hole, and wherein the locking portion is integrally formed on an upper end of the tubular portion.

3. A hydraulic shock absorber mounting structure as set forth in claim 2, wherein the locking portion includes a plurality of locking parts which extend radially from the tubular portion and are provided circumferentially at regular intervals.

4. A hydraulic shock absorber mounting structure as set forth in claim 2, wherein the locking portion includes a plurality of locking parts which extend radially from the tubular portion and are provided circumferentially at regular intervals, each of the locking parts being formed into a hook-like shape which is pointed upwardly.

5. A hydraulic shock absorber mounting structure as set forth in claim 1, wherein the locking portion has a hook-like shape.

6. A hydraulic shock absorber mounting structure as set forth in claim 1, wherein said locking portion is formed with a substantially tapered shape including an upper section and a lower section which is wider than said upper section.

7. A hydraulic shock absorber mounting structure comprising:
    a hydraulic shock absorber having a hydraulic cylinder, and a rod protruding telescopically from the hydraulic cylinder;
    a fastening member for fastening the hydraulic shock absorber to a vehicle body; and
    a resilient body, having at least a portion of a lower member thereof disposed between the hydraulic shock absorber and the vehicle body when the hydraulic shock absorber is mounted to the vehicle body,
    wherein the lower member of the resilient body includes a locking portion which is brought into engagement with a mounting hole of the vehicle body and is operable to prevent the hydraulic shock absorber from falling out of the mounting hole after engagement of the locking portion with the mounting hole,
    wherein an upper member of the resilient body is independent of, and separable from, the lower member, and
    wherein the upper member is secured to the rod using the fastening member such that when installed on a vehicle body, the upper member is disposed between the fastening member and the vehicle body, the vehicle body is disposed between the lower member and the upper member, and the locking portion is disengaged from the mounting hole and resides within the mounting hole.

8. A hydraulic shock absorber mounting structure as set forth in claim 7, wherein the resilient body further includes a tubular portion operable to be fit on an outer circumference of the rod and being integrally formed with the locking portion at an upper end thereof so that when the rod is inserted from below into the mounting hole of the vehicle body, the tubular portion is inserted into the mounting hole and the locking portion is protruded from and brought into engagement with the mounting hole of the vehicle body.

9. A hydraulic shock absorber mounting structure as set forth in claim 8, wherein the locking portion includes a plurality of locking parts which extend radially from the tubular portion and are provided circumferentially at regular intervals.

10. A hydraulic shock absorber mounting structure as set forth in claim 8, wherein the locking portion includes a plurality of locking parts which extend radially from the tubular portion and are provided circumferentially at regular intervals, each of the locking parts being formed into a hook-like shape which is pointed upwardly.

11. A hydraulic shock absorber mounting structure as set forth in claim 7, wherein the fastening member includes a nut for fastening the rod to the vehicle body after engagement of the locking portion with the mounting hole of the vehicle body.

12. A hydraulic shock absorber mounting structure as set forth in claim 7, wherein the locking portion has a hook-like shape.

13. A hydraulic shock absorber mounting structure as set forth in claim 7 wherein said locking portion is formed with a substantially tapered shape including an upper section and a lower section which is wider than said upper section.

14. A shock absorber mounting structure comprising: a resilient body operable to be fixed on a rod of a hydraulic shock absorber, the resilient body including
    an upper member and a lower member, wherein the upper and lower members are independent and separable, the upper and lower members are each formed in a cup shape, with the upper member oriented to open downwardly and the lower member oriented to open upwardly, and
    a fastening locking portion operable for engagement with a structure to which the hydraulic shock absorber is to be mounted for preventing the hydraulic shock absorber from falling out of engagement with the structure after the locking portion is operatively engaged with the structure, the locking portion being integrally formed on an upper portion of the lower member which extends upwardly from an inner surface of the lower member.

15. A shock absorber mounting structure according to claim 14, wherein the resilient body further includes a tubular portion operable to be fit on an outer circumference of the rod and being integrally formed with the locking portion at an upper end thereof so that when the rod is inserted from below into the structure to which the hydraulic shock absorber is to be mounted, the tubular portion is inserted into the structure to which the hydraulic shock absorber is to be mounted and the locking portion is protruded from and brought into engagement with the structure to which the hydraulic shock absorber is to be mounted.

16. A shock absorber mounting structure according to claim 15, wherein the locking portion includes a plurality of locking parts which extend radially from the tubular portion and are provided circumferentially at regular intervals.

17. A hydraulic shock absorber mounting structure as set forth in claim 15, wherein the locking portion includes a plurality of locking parts which extend radially from the tubular portion and are provided circumferentially at regular intervals, each of the locking parts being formed into a hook-like shape which is pointed upwardly.

18. A hydraulic shock absorber mounting structure as set forth in claim 14, wherein the locking portion has a hook-like shape.

19. A shock absorber mounting structure according to claim 14 wherein said locking portion is formed with a substantially tapered shape including an upper section and a lower section which is wider than said upper section.

20. A hydraulic shock absorber mounting structure, comprising:
  a hydraulic shock absorber having a hydraulic cylinder, and a rod protruding telescopically from the hydraulic cylinder;
  a tubular collar which surrounds and is affixed to the rod of the hydraulic shock absorber;
  a resilient body operatively attached to the tubular collar via an interference fit thereon, said resilient body configured to have at least a portion thereof disposed between the hydraulic shock absorber and the vehicle body when the hydraulic shock absorber is mounted to the vehicle body; and
  a nut configured for cooperative engagement with the rod;
  wherein the resilient body includes a locking portion for engagement with a mounting hole of the vehicle body, wherein the resilient body is operable to prevent the hydraulic shock absorber from falling out of the mounting hole after engagement of the locking portion with the mounting hole, and wherein said locking portion is formed with a substantially tapered shape including an upper section and a lower section which is wider than said upper section, and
  wherein the nut is secured to the rod subsequent to the engagement of the locking portion with the mounting hole, and wherein the locking portion is simultaneously displaced downwardly relative to the tabular collar and disengaged from the mounting hole upon securement of the nut to the rod.

* * * * *